Patented Mar. 26, 1929.

1,706,946

UNITED STATES PATENT OFFICE.

WERNER ZERWECK, OF FECHENHEIM, NEAR FRANKFORT-ON-THE-MAIN, GERMANY, ASSIGNOR TO GRASSELLI DYESTUFF CORPORATION, OF NEW YORK, N. Y., A CORPORATION OF DELAWARE.

AZO DYESTUFFS AND PROCESS OF MAKING SAME.

No Drawing. Application filed November 15, 1926, Serial No. 148,620, and in Germany November 17, 1925.

The invention relates to new azo dyestuffs and a process of making the same, said dyestuffs having probably the general formula:

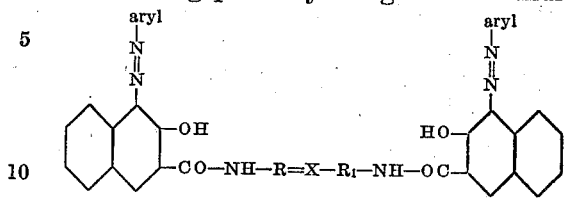

wherein X represents the triazolic group

or the ditriazolic groups

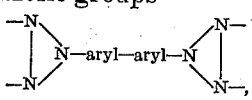

R and $R_1$ represent aryl residues of the group including the benzene and naphthalene series which in addition to the amino group may be further substituted. The new dyestuffs may be obtained by combining any diazo compound not containing a sulfonic acid group with a derivative of 2.3-hydroxynaphthoic acid of the general formula:

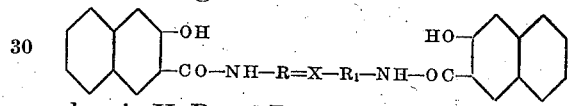

wherein X, R and $R_1$ have the same definition as above.

These derivatives of 2.3-hydroxynaphthoic acid are not described hitherto in literature. They are easily obtainable by condensing according to U. S. A. Patent 1,101,111 one or two molecular proportions of 2.3-hydroxynaphthoic acid with the corresponding aromatic mono- or diamines, containing once or twice the triazolic group in their molecule. The aminotriazolic compounds may be obtained for instance by oxidizing correspondingly substituted ortho-amino-azo bodies.

The new dyestuffs yield valuable color lakes, when mixed with the usual substrata, they are particularly adapted for being produced on the vegetable fiber, because the derivatives of 2.3-hydroxynaphthoic acid of the above-said formula are distinguished by an especial affinity to the vegetable fiber. It is therefore not necessary to dehydrate the padded dyed goods as far as possible by squeezing, pressing or centrifuging prior to developing, it is sufficient to treat the padded dyed goods in moist condition with the usual rinsing solution. The dyeings, obtained by developing with various diazosolutions, range from yellowish to black and possess a remarkable brightness and intensity and, owing to the substantive character of the used azocomponent, an especial fastness to rubbing.

In order to further illustrate my invention the following example is given, the parts being by weight and all temperatures in centigrade degrees, but it is understood that my invention is not limited to the particular products or reaction conditions mentioned therein.

*Example.*

Cotton yarn, which has been well boiled and dried, is impregnated with a solution of 10 grams of the di-2.3-hydroxynaphthoyl-compound of 5-amino-2-(para-aminophenyl)-1.3-benzotriazol, 17 c. c. of caustic soda solution of 34° Bé. and 25 c. c. of Turkey red oil per liter, well wrung out, rinsed and, without being dried, developed with a diazosolution, neutralized with a solution of sodium acetate and containing 3 grams of 3-nitro-1.4-toluidin per liter.

The dyestuff, thus produced on the fiber, has probably the formula:

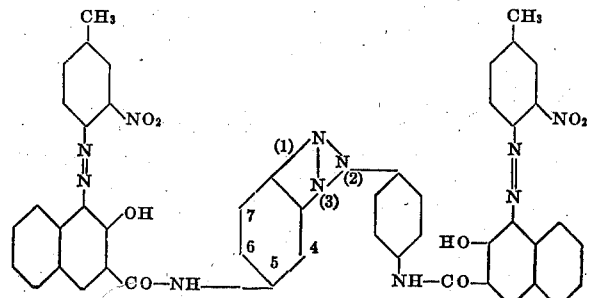

It yields red dyeings of an excellent brightness and fastness.

The aforesaid 5-amino-2-(para-aminophenyl)-1.3-benzotriazol may be obtained by diazotizing para-amino-acetanilid, combining the diazocompound with meta-phenylendiamine, oxidizing the ortho-amino-body, thus obtained, to the triazol derivative by means of an ammoniacal cuprous solution according to German Patent 338,926 and splitting the acetyl-group by means of sulfuric acid. The diamine thus prepared crystallizes from dilute alcohol in feebly yellowish colored needles melting at 202°. It is easily soluble in dilute hydrochloric acid and forms a difficultly soluble sulfate.

If instead of the di-2-3-hydroxynaphthoyl compound of the named triazol derivative that of the 5-amino-2-(meta-aminophenyl)-1.3-benzotriazol (obtainable in an analogous manner from m-aminoacetanilide) is used for the process, a brilliant scarlet red is obtained, when combined with diazotized 3-nitro-1.4-toluidin, and a brilliant bluish red, when combined with diazotized para-chloro-ortho-toluidin.

The new dyestuffs may also be produced by printing a diazosolution on a padded material according to the usual method or also according to the nitrosamin printing process.

In the same manner the process may be conducted with other diazo-, tetrazo- or polyazo bodies and the 2.3-hydroxynaphthoyl compounds of other triazolic derivatives.

The following table gives the shades obtained on cotton material by producing some other dyestuffs according to my process:

| Two molecular proportions of the diazocompound or one molecular proportion of the tetrazocompound of— | Combined with the di-2,3-hydroxynaphthoyl-derivatives of— | Shades |
|---|---|---|
| 3-nitro-1.4-toluidin | 5-amino-2-(m-amino-phenyl-) 1.3-benz-triazol | Bluish red. |
| p-nitranilin | ......do...... | Scarlet. |
| 4-nitro-1.2-toluidin | ......do...... | Yellowish red. |
| 5-nitro-1.2-anisidin | ......do...... | Claret red. |
| Diamino-diphenyl-methane | ......do...... | Bluish black. |
| o-methoxy-benzolazo-α-naphthylamine | ......do...... | Violet black. |
| 3-nitro-1.4-toluidin | 5-amino-2-(p-amino-phenyl)1.3-benz-triazol | Bluish red. |
| p-nitranilin | ......do...... | Scarlet. |
| 4-nitro-1.2-toluidin | ......do...... | Yellowish red. |
| diaminodiphenyl-methane | ......do...... | Bluish black. |
| o-methoxy-benzolazo-α-naphthylamine | ......do...... | Bluish violet-black. |
| 3-nitro-1.4-toluidin | 5-amino-6-methyl-2-(4'-methyl-5'-amino-phenyl) 1.3-benztriazol. | Bluish red. |
| p-nitranilin | ......do...... | Scarlet. |
| 4-nitro-1.2-toluidin | ......do...... | Yellowish red. |
| m-nitranilin | 5-amino-6-methyl-2-(4'-methyl-5'-amino-phenyl) 1.3-benztriazol. | Orange. |
| 5-nitro-1.2-anisidin | ......do...... | Claret red. |
| 4-nitro-1.2-anisidin | ......do...... | Red. |
| Diamino-diphenylamine | ......do...... | Bluish black. |
| o-methoxy-benzolazo-α-naphthylamine | ......do...... | Black. |
| 3-nitro-1.4-toluidin | 5-amino-4-methyl-2-(m-amino-phenyl) 1.3-benztriazol. | Red. |
| p-nitranilin | ......do...... | Scarlet. |
| 4-nitro-1.2-toluidin | ......do...... | Yellowish red. |
| Diamino-diphenyl-methane | ......do...... | Bluish black. |
| o-methoxy-benzolazo-α-naphthylamine | ......do...... | Dark black. |
| 3-nitro-1.4-toluidin | 5-amino-6-chlor-2-(m-aminophenyl) 1.3-benztriazol. | Brilliant red. |
| p-nitranilin | ......do...... | Brilliant scarlet. |
| 4-nitro-1.2-toluidin | ......do...... | Yellowish red. |
| p-chlor-o-toluidin | 5-amino-6-methoxy-2-(3'-amino-4'-methoxy-phenyl) 1.3-benztriazol. | Brilliant red. |
| p-chlor-o-toluidin | 5-amino-6-methoxy-2-(2'-methyl-4'-amino-5'-methoxy-phenyl)-1.3-benztriazol. | Bluish red. |
| Diamino-diphenyl-amine | (structure shown) | Black. |
| Diamino-diphenyl-amine | (structure shown) | Black. |
| p-nitranilin | (structure shown) | Brownish red. |

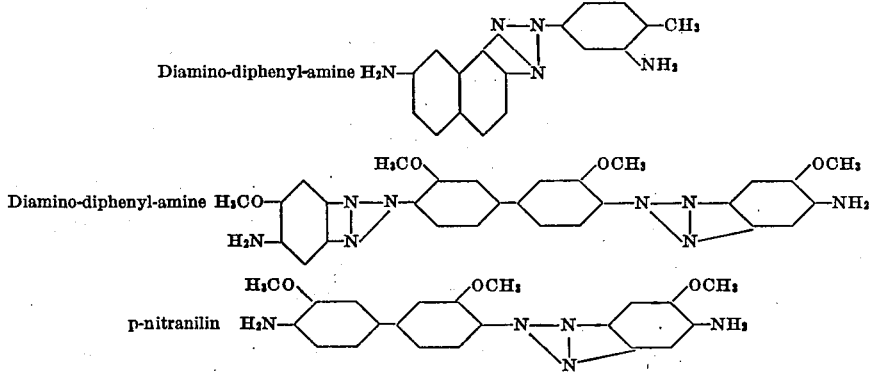

The dyestuff resulting from the combination of two molecular proportions of the diazo compound of p-chlor-o-toluidine with the di-2.3-hydroxynaphthoyl derivative of 5-amino-6-methoxy-2-(3'-amino-4'-methoxyphenyl)-1.3-benztriazol has the following probable formula:

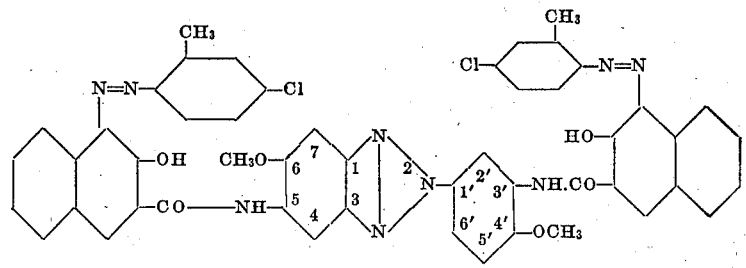

I claim:

1. As new compounds the unsulfonated and uncarboxylated azodyestuffs having probably the general formula:

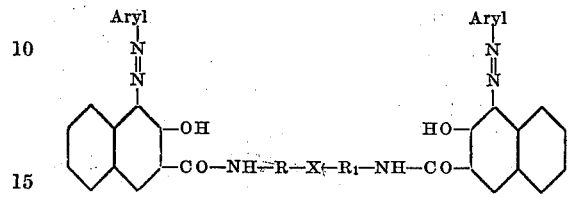

in which formula X represents the triazolic group

or the ditriazolic group

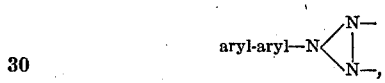

and R and $R_1$ represent aryl residues of the group including the benzene and naphthalene series which in addition to the amino group may be further substituted, yielding upon reduction with stannous chloride an arylamin (two molecular proportions) and the corresponding derivative of the 1-amino-2-hydroxylnaphthalene-3-carboxyamide, being adapted for the production of valuable color lakes, when mixed with the usual substrata, and yielding when produced on the vegetable fiber dyeings of a remarkable brightness and intensity and an excellent fastness, especially to rubbing.

2. The process of making new azodyestuffs which comprises combining any aromatic diazocompound, not containing a sulfonic group, with a derivative of 2.3-hydroxynaphthoic acid of the general formula:

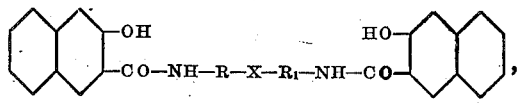

in which formula X represents the triazolic group

or the ditriazolic group

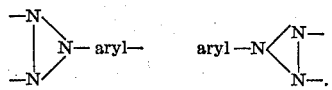

and R and $R_1$ represent aryl residues of the group including the benzene and naphthalene series which in addition to the amino group may be further substituted.

3. The process of producing new azodyestuffs on the vegetable fiber which comprises impregnating the fiber with a derivative of 2.3-hydroxynaphthoic acid of the general formula:

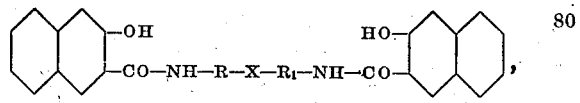

in which formula X represents the triazolic group

or the ditriazolic group

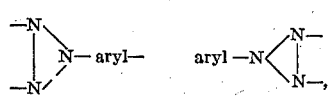

and R and $R_1$ represent aryl residues of the group including the benzene and naphthalene series which in addition to the amino group may be further substituted, and developing then with any aromatic diazocompound, not containing a sulfonic group.

4. Materials dyed with the new azodyestuffs of claim 1, said dyestuffs being produced on the fiber of the material.

5. As new compounds the unsulfonated and uncarboxylated azodyestuffs of the general formula:

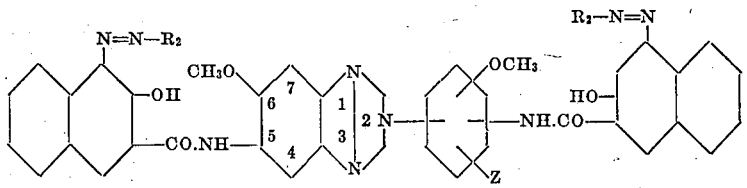

wherein $R_2$ represents a benzene nucleus which may be substituted by halogen, alkyl, alkoxy or nitro, and Z represents hydrogen or methyl.

6. As new compounds the unsulfonated and uncarboxylated azodyestuffs of the general formula:

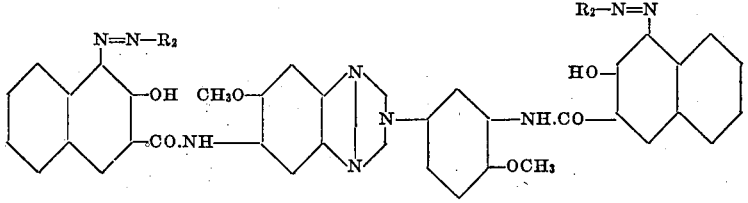

wherein $R_2$ represents a benzene nucleus which may be substituted by halogen, alkyl, alkoxy or nitro.

7. Materials dyed with the new azodyestuffs of claim 5, said dyestuffs being produced on the fiber of the material.

8. Materials dyed with the new azodyestuffs of claim 6, said dyestuffs being produced on the fiber of the material.

9. As new compounds the unsulfonated and uncarboxylated azodyestuffs of the general formula:

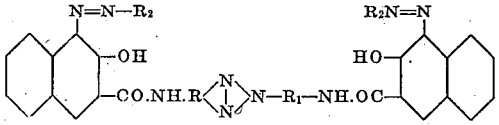

wherein R and $R_1$ represent nuclei of the benzene or naphthalene series which may be substituted by halogen, alkyl or alkoxy and $R_2$ represents a nucleus of the benzene or napththalene series which may be substituted by halogen, alkyl, alkoxy or nitro.

10. As new compounds the unsulfonated and uncarboxylated azodyestuffs of the general formula:

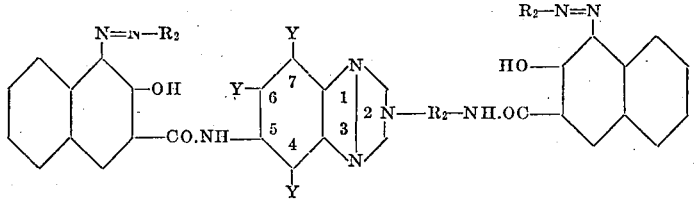

wherein $R_2$ represents a benzene nucleus which may be substituted by halogen, alkyl, alkoxy or nitro and one of the Y's represents halogen, alkyl or alkoxy and the other Y represents hydrogen.

11. Materials dyed with the new azodyestuffs of claim 9, said dyestuff being produced on the fiber of the material.

12. Materials dyed with the new azodyestuffs of claim 10, said dyestuff being produced on the fiber of the material.

In testimony whereof, I affix my signature.

WERNER ZERWECK.

CERTIFICATE OF CORRECTION.

Patent No. 1,706,946. Granted March 26, 1929, to

WERNER ZERWECK.

It is hereby certified that error appears in the printed specification of the above numbered patent requiring correction as follows: Page 4, lines 37 and 38, for "Y represents" read "Y's represent"; and that the said Letters Patent should be read with this correction therein that the same may conform to the record of the case in the Patent Office.

Signed and sealed this 23rd day of April, A. D. 1929.

(Seal)

M. J. Moore,
Acting Commissioner of Patents.